United States Patent [19]

Usuki et al.

[11] Patent Number: 5,730,683
[45] Date of Patent: Mar. 24, 1998

[54] SHIFT CONTROL METHOD FOR AUTOMATIC TRANSMISSION AND APPARATUS THEREOF

[75] Inventors: Katsutoshi Usuki, Toyoake; Kenjiro Fujita, Kusatsu; Takeo Hiramatsu, Nagaokakyo, all of Japan

[73] Assignee: Mitsubishi Jidosha Kogyo Kabushiki Kaisha, Tokyo, Japan

[21] Appl. No.: 677,784

[22] Filed: Jul. 10, 1996

[30] Foreign Application Priority Data

Jul. 10, 1995 [JP] Japan ................................ 7-173095

[51] Int. Cl.$^6$ ................................................. F16H 61/04
[52] U.S. Cl. ........................ 477/143; 477/144; 477/148; 477/68; 74/335
[58] Field of Search ................... 477/68, 78, 79, 477/86, 143, 144, 148; 475/121, 122; 74/335

[56] References Cited

U.S. PATENT DOCUMENTS

| | | | |
|---|---|---|---|
| 5,131,298 | 7/1992 | Marusue | 477/144 |
| 5,150,296 | 9/1992 | Iwatsuki et al. | 477/143 X |
| 5,642,283 | 6/1997 | Schulz et al. | 477/68 X |

FOREIGN PATENT DOCUMENTS

| | | |
|---|---|---|
| 5172231 | 7/1993 | Japan. |
| 6331012 | 11/1994 | Japan. |

*Primary Examiner*—Khoi Q. Ta

[57] ABSTRACT

In a shift control method, when a speed ratio of an automatic transmission is shifted from a third speed ratio to a first speed ratio before stoppage of a vehicle, a down shift line 3-1 in a shift pattern is shifted to a high-speed side to initiate shifting under a power-OFF condition. A third brake is released by setting the duty ratio of an electromagnetic valve of the third brake at 0% to establish a free condition (neutral condition) in an output shaft of a second transmission. While the duty ratio of an electromagnetic valve of a second clutch in a first transmission mechanism is set at 0%, the duty ratio of an electromagnetic valve of a second brake is gradually increased, so that the shifting from the second clutch to the second brake is made, and the first transmission mechanism is operatively shifted from the third speed ratio to a speed ratio corresponding to the first speed ratio. Then, the third brake is engaged again upon completion of the shifting and after mechanical engagement of a one-way clutch. Consequently, it is possible to reduce shocks in shifting the speed of the vehicle.

14 Claims, 8 Drawing Sheets

Fig.7

| speed ratios | 1st clutch 8 | 2nd clutch 9 | 1st brake 11 | 2nd brake 12 | 3rd clutch 10 | 3rd brake 41 | 4th clutch 38 | one-way clutch 40 |
|---|---|---|---|---|---|---|---|---|
| P | — | — | — | — | — | — | — | — |
| R | — | — | — | O | O | O | — | — |
| N | — | — | — | O | — | O | — | — |
| 1st speed ratio | O | — | — | O | — | O | — | O |
| 2nd speed ratio | O | — | O | — | — | O | — | O |
| 3rd speed ratio | O | O | — | — | — | O | — | O |
| 4th speed ratio | O | O | — | — | — | — | O | — |
| 5th speed ratio | — | O | O | — | — | — | O | — |

SHIFT CONTROL METHOD FOR AUTOMATIC TRANSMISSION AND APPARATUS THEREOF

BACKGROUND OF THE INVENTION

This invention relates to a shift control method and apparatus for an automatic transmission in which hydraulic pressures supplied to a plurality of frictional engaging elements are electronically controlled, respectively, and frictional engaging elements are selectively engaged to achieve a plurality of speed ratios, especially, to prevent a driver from feeling uncomfortable at the time of downshift before stoppage of a vehicle.

An automatic transmission for a vehicle selectively supplies and exhausts hydraulic fluid to and from frictional engaging elements such as clutches and brakes to change their engaging condition to connect a desired rotary element in its gear system to an input shaft of the transmission or fix a desired rotary element to the transmission casing, thereby automatically changing the speed ratio according to operation conditions of the vehicle. In such an automatic transmission, there are demands for small shift shocks to protect various parts and compounds and maintain comfortable drive feeling. For this purpose, various automatic transmissions have been proposed, to reduce the shift shocks, by electronically controlling the hydraulic pressure and its supply and exhaust timing to and from the frictional engaging elements. (Japanese Patent Laid-open publications No. 5-172231 and No. 6-331012)

A conventional automatic transmission carries out a shift from a current speed ratio to a target speed ratio is accordance with an instruction from a controller generated based on a predetermined program. Namely, the controller releases engagement of a frictional engaging element (frictional engaging elements at the releasing side) for achieving the current speed ratio, and engages with a frictional engaging element (frictional engaging element at the engaging side) for achieving the target speed ratio, while increasing a rotational speed of an input shaft of the transmission such that a changing ratio of the rotating speed of the generated input shaft matches the target changing ratio, thereby carrying out a switching operation from the engaging element at the releasing side to that of the engaging side. By this operation, a transmission passage of an engine torque is switched from the frictional engaging elements at the releasing side to the frictional engaging elements at the engaging side. Supply and exhaust of hydraulic pressure to each frictional engaging element is controlled to an optimum valve by varying the duty ratio of an electromagnetic valve between 0% to 100% based on an instruction of the controller. Further, when the duty ratio is 0%, the hydraulic pressure is exhausted due to the continuous demagnetized condition of the electromagnetic valve, and when the duty ratio is 100%, the maximum hydraulic pressure is supplied due to the continuous excited condition of the electromagnetic valve.

The automatic transmission as described above when reducing speed to stop the vehicle, shifts, for example, from a third speed ratio to a first speed ratio, the shifting from the third speed ratio to the first speed ratio is achieved by the release of the clutch and the engagement of the brake, namely, by the switching operation from the clutch to the brake.

When stopping the vehicle, the shifting from the third speed ratio to the first speed ratio is carried out in an area (power-ON area) where a rotating speed of the input shaft becomes lower than an idle rotation speed of the engine as the vehicle speed is lowered. Namely, the shift is carried out by the switching from the second clutch to the second brake at extremely low speed in a range of the rotation under the condition that the rotation speed of the input shaft is lower than the idle rotation speed of the engine. Therefore, the difference between the rotation speed of the engine and the input shaft is larger, and torque of an output shaft is increased to torque of the first speed ratio in a short period of time during which a gear ratio of the first speed ratio is combined with a torque increase due to a torque converter.

In the conventional automatic transmission, however, at the time of shifting from the third speed ratio to the first speed ratio before stopping the vehicle, a feeling of the vehicle being pushed forward is caused just before the vehicle stops. Particularly, in the automatic transmission having five forward speeds as illustrated in FIG. 5, the feeling of the vehicle being pushed forward is strong as a result of the high reducing ratio of the first speed ratio, and there is disadvantage of having an uncomfortable feeling caused by such a shift.

SUMMARY OF THE INVENTION

It is therefore an object of the present invention to provide a shift control method which is capable of having no shock during the shift and to provide a shift control method which is capable of reducing the feeling of the vehicle being pushed forward at the time of the down-shift before stoppage of the vehicle.

In accordance with this invention, there is provided a shift control method for an automatic transmission having a first transmission unit connected to an engine, the first transmission unit achieving a plurality of speed ratios, and a second transmission unit achieving a plurality of speed ratios, a power transmission path of the second transmission unit being connected in series with a power transmission path of the first transmission unit.

The method comprises instructing the automatic transmission to downshift from a first speed ratio to a second speed ratio, the first speed ratio being high than the second speed ratio, establishing a neutral condition in one of the first and second transmission units based on the instruction, shifting a speed ratio of the other of the first and second transmission units from a first condition corresponding to the first speed ratio to a second condition corresponding to the second speed ratio, and shifting a speed ratio of the one of the first and second transmission units from the neutral condition to a third condition corresponding to the second speed ratio after completing the shifting from the first condition to the second condition.

The method further comprises detecting an operating condition of the engine, wherein the neutral condition is established when a power-off condition of the engine is detected.

The method has the neutral condition being established by disengaging a hydraulic frictional engaging element provided in the one of the first and second transmission units.

The method has the speed ratio of the one transmission mechanism being equal to the second speed ratio and the first speed ratio, and the hydraulic frictional engaging element being engaged again after an engagement of a one-way clutch provided in the one of the first and second transmission.

The method has the other of the first and second transmission units including a first hydraulic frictional engaging element to be engaged upon achieving the first speed ratio, a second hydraulic engaging element to be engaged upon achieving the second speed ratio.

The method further comprises releasing the first hydraulic frictional element based on the down shift instruction, and starting engagement of the second hydraulic engaging element after the lapse of a predetermined time from the down shift instruction.

The method has the automatic transmission, including a hydraulic control unit for controlling a hydraulic pressure supplied to each hydraulic frictional engaging element. The hydraulic control unit comprises an electromagnetic valve for controlling the hydraulic pressure supplied to the second hydraulic frictional engaging element, a third hydraulic frictional engaging element disposed in either one of the first transmission mechanism and the second transmission mechanism, the third hydraulic frictional engaging element being engaged upon achieving a predetermined speed ratio independently from the second hydraulic frictional engaging element, a switch valve for switching over the hydraulic pressure, regulated by the electromagnetic valve, between a first position for supplying the regulated hydraulic pressure to the second hydraulic frictional engaging element and a second position for supplying the regulated hydraulic pressure to the third hydraulic frictional engaging element, wherein the predetermined time is a time for switching the electromagnetic valve from the second position to the first position.

The method has the hydraulic pressure supplied to the second hydraulic frictional engaging element being increased by a predetermined ratio.

The automatic transmission system is for downshifting from a first speed ratio to a second speed ratio, the first speed ratio is higher than the second speed ratio, and comprises a first transmission unit connected to an engine, the first transmission unit achieving a plurality of speed ratios, a second transmission unit achieving a plurality of speed ratios, a power transmission path of the second transmission unit being connected in series with a power transmission path of the first transmission unit, and a control unit instructing the automatic transmission system to downshift from the first speed ratio to the second speed ratio, instructing one of the first and second transmission units to establish a neutral condition, instructing to shift a speed ratio of the other of the first and second transmission units from a first condition corresponding to the first speed ratio to a second condition corresponding to the second speed ratio, and instructing to shift a speed ratio of the one of the first and second transmission units from the neutral condition to a third condition corresponding to the second speed ratio after completing the shift from the first condition to the second condition.

The automatic transmission system further comprises a detecting unit detecting an operating condition of the engine, wherein the control unit instructs the one of the first and second transmission units to establish the neutral condition when a power-OFF condition of the engine is detected.

The automatic transmission system has one of the first and second transmission units including a hydraulic frictional engaging element being engaged when establishing the first speed ratio, and an one-way clutch provided in parallel to the hydraulic frictional engaging element, wherein the control unit disengages the hydraulic frictional engaging element to establish the neutral condition when the power-OFF condition of the engine is detected.

the automatic transmission system has the speed ratio of the one of the first and second transmission units being substantially the same as the second speed ratio and first speed ratio, and the hydraulic frictional engaging element being engaged again after an engagement of the one-way clutch has been established.

The automatic transmission system has the other of the first and second transmission units including a first hydraulic frictional engaging element being engaged upon establishing the first speed ratio, and a second hydraulic frictional engaging element being engaged upon establishing the second speed ratio, the controller releases the first hydraulic frictional engaging element upon instructing the downshift, and initiates engagement of the second hydraulic frictional engaging element after lapse of a predetermined time from the downshift instruction.

The automatic transmission system further comprises an electromagnetic valve controlling hydraulic pressure supplied to the second hydraulic friction engaging element, a third hydraulic frictional engaging element disposed in either one of the first said second transmission units, the third hydraulic frictional engaging element being engaged upon establishing a predetermined speed ratio independently from the second hydraulic frictional engaging element, a switch valve switching a position of the electromagnetic valve between a first position for supplying a hydraulic pressure regulated by the electromagnetic valve to the second hydraulic frictional engaging element, and a second position for supplying the regulated hydraulic pressure to the third hydraulic frictional engaging element.

The predetermined time is a time for switching the electromagnetic valve from the second position to the first position.

The automatic transmission system has the control unit increasing the hydraulic pressure supplied to the second hydraulic frictional engaging element by a predetermined ratio.

BRIEF DESCRIPTION OF THE DRAWINGS

FIG. 7 is an operating element chart showing the relationship between engagement condition of individual frictional engaging elements and speed ratios.

DESCRIPTION OF THE PREFERRED EMBODIMENTS

A preferred embodiment of a shift control method according to the present invention will be clearly understood from the following description by referring to the accompanying drawings.

Figure 5:
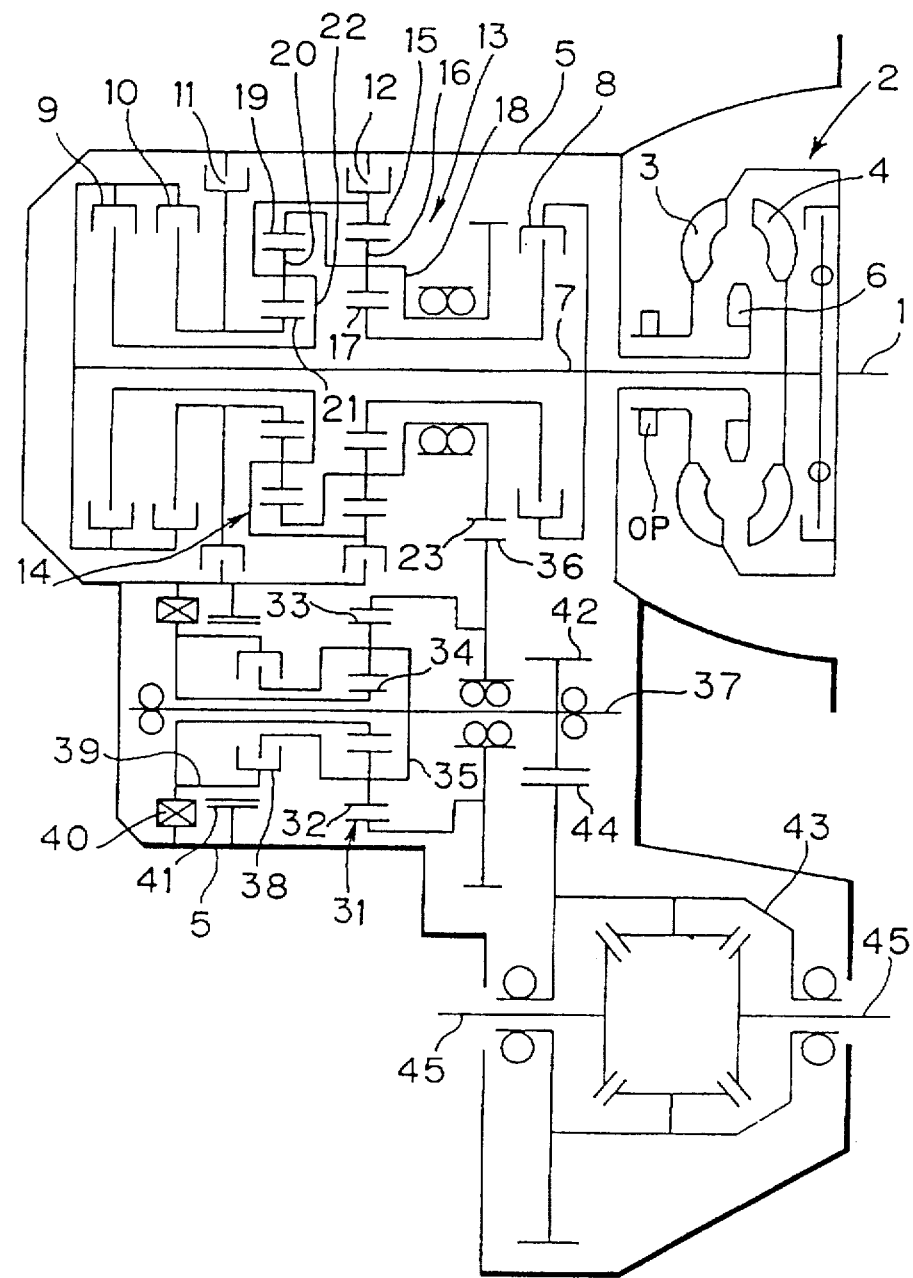
FIG. 5 is a schematic view showing a structure of an automatic transmission.

A general automatic transmission will be explained referring to FIG. 5. FIG. 5 is a schematic view showing the structure of an automatic transmission for achieving five forward speeds and a single reverse speed. The automatic transmission as shown in FIG. 5 comprises a pump 3 of a torque converter 2 integrally connected to a crank shaft 1 of an engine (not shown). The torque converter 2 comprises the pump 3, a turbine 4, and a stator 6. The torque transmitted from the engine to the turbine 4 is transmitted by an input shaft 7 (a turbine shaft) to the first gear transmission mechanism (a first transmission mechanism) disposed at the rear of the input shaft 7.

The first gear transmission mechanism comprises first to third clutches 8 to 10, first and second brakes 11 and 12 as frictional engaging elements, and a first and a second planetary gear mechanisms 13 and 14. The first gear transmission mechanism 13 comprises a ring gear 15, a pinion 16, a sun gear 17, and a carrier 18 which rotatably supports the pinon 16 and is rotatable by itself. The second planetary gear mechanism 14, located in series with respect to the first planetary gear mechanism 13, comprises a ring gear 19, a pinon 20, a sun gear 21, and a carrier 22 which rotatably supports the pinon 20 and is rotatable by itself.

The sun gear 17 in the first planetary gear mechanism 13 is connectable to the input shaft 7 through the first clutch 8, and a drive gear 23 is connected at the carrier 18 in the first planetary gear mechanism 13. The ring gear 15 can be fixed to a case 5 by the second brake 12. Further, the carrier 22 in the second planetary gear mechanism 14 is connectable to the input shaft 7 through the second clutch 9, and the sun gear 21 in the second planetary gear mechanism 14 is connectable to the input shaft 7 through the third clutch 10. The sun gear 21 can be fixed to the case 5 by the first brake 11. Furthermore, the carrier 22 is connected to the ring gear 15 in the first planetary gear mechanism 13, and the ring 19 is connected to the carrier 18 and the drive gear 23 in the first planetary gear mechanism 13.

On the other hand, as a drive transmission system, the second gear transmission mechanism (the second transmission mechanism) is connected to the rear of the first gear transmission mechanism. Namely, the third planetary gear mechanism 31 is located substantially parallel to the first planetary gear mechanism 13 and the second planetary gear mechanism 14. The third planetary gear mechanism 31 comprises a ring gear 32, a pinion 33, a sun gear 34, and a carrier 35 which rotatably supports a pinion 33 and is rotatable by itself. The ring gear 32 is in the third planetary gear mechanism 31 is connected to a driven gear 36 which is engaged with the drive gear 23, thus the torque transmitted through the first planetary gear mechanism 13 and the second planetary gear mechanism 14 is to be transmitted thereby. The carrier 35 in the third planetary gear mechanism 31 is connected to an output shaft 37, and also to a drum 39 through a fourth clutch 38.

the drum 39 is connected to the sun gear 34 in the third planetary gear mechanism 31, and can be fixed to the case 5 by an one-way clutch 40. Further, the drum 39 can be fixed to the case 5 by the third brake 41. An output gear 42 is fixed to the output shaft 37, and the output gear 42 engages with a gear 44 in a differential carrier 43, and a rotation force from the output shaft 37 is transmitted to the differential carrier 43. The torque, input from the input shaft 7 and passed through the first planetary gear mechanism 13, the second planetary gear mechanism 14, and the third planetary gear mechanism 31, is transmitted from the output shaft 37 to both the right and left drive shafts 45 through the differential carrier 43. The drive shafts 45 are connected to a pair of tires (not shown).

Figure 6:
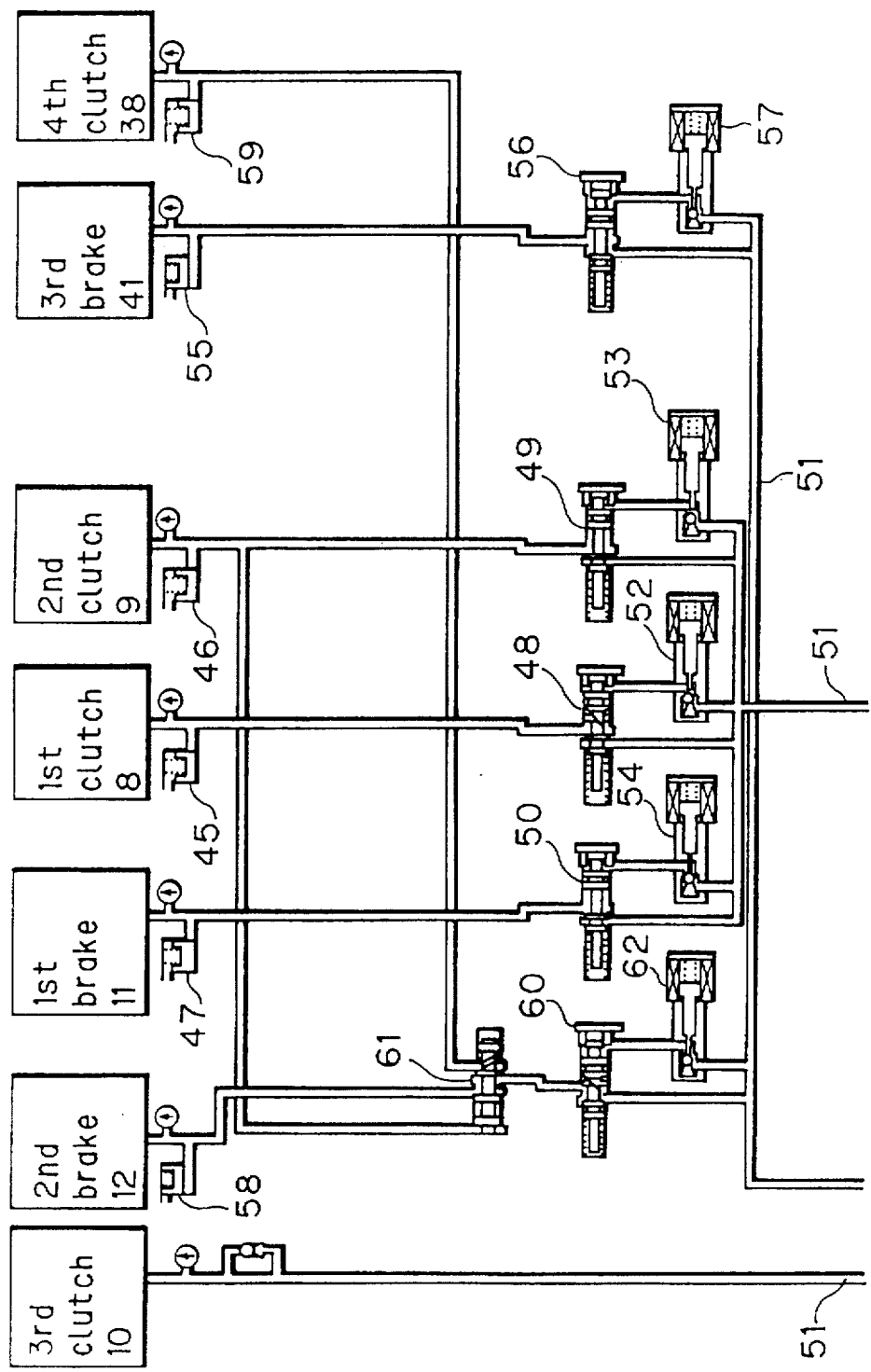
FIG. 6 is a view showing a structure of the essential portion of a hydraulic pressure control unit.

The first, second and third clutches 8, 9, and 10, the fourth clutch 38, the first brake 11, the second brake 12, and the third brake 41 as frictional engaging elements each comprises a hydraulic mechanism provided with an engaging piston device or a servo mechanism, and selectively operated through a hydraulic control unit shown in FIG. 6 by a hydraulic fluid generated by an oil pump OP connected to the pump 3 of the torque converter 2. The hydraulic control unit is operated according to instructions of the controller corresponding to a driving condition of a vehicle (speed of the vehicle or a throttle opening) and the position of the shift lever selected by a driver, thus various speed ratios are automatically achieved.

Referring to FIG. 6, the hydraulic control unit will be explained. FIG. 6 shows a schematic view of a circuit of a supplying system in the hydraulic control unit.

As shown in FIG. 6, an oil passage 51 operative linked with the oil pump OP is connected to the first clutch 8, the second clutch 9, and the first brake 11 through pressure valves 48, 49, and 50, respectively. The operations of the pressure valves 48, 49, and 50 are controlled by an electromagnetic valve for the first clutch 52, an electromagnetic valve for the second clutch 53, and an electromagnetic valve for the first brake 54. Further, the oil passage 51 operatively linked with the oil pump OP is connected to the third brake 41 through a pressure valve 56. The operation of the pressure valve 56 is controlled by an electromagnetic valve for third brake 57. Although not shown, a regulator valve is provided in the oil passage 51 for regulating the discharge pressure from the oil pump OP to a predetermined hydraulic pressure (a line pressure).

Further, the oil passage 51 is connected to the second brake 12 and the fourth clutch 38 through a pressure valve 60 and a switch valve 61. The operation of the pressure valve 60 is controlled by the electromagnetic valve for the second brake 62. The switch valve 61 is switched such that when supplying the hydraulic pressure to the second clutch 9, the hydraulic pressure transmitted from the pressure valve 60 is supplied to the fourth clutch 38, when the hydraulic pressure is not supplied to the second clutch 9, the switch valve 61 is switched such that the hydraulic pressure from the pressure valve 60 is supplied to the second brake 12. Further, the oil passage 51 is connected to the third clutch 10. Accumulators 45, 46, 47, 55, 58, and 59 are disposed at oil passage connected to each of the clutches and the brakes, respectively (except the third clutch 10).

Electromagnetic valves 52, 53, 54, 57, and 62 are controlled with a duty ratio according to instructions of the controller (not shown), respectively, and the hydraulic pressure from each pressure valve 48, 49, 50, 56, and 60 to each clutch and each brake is regulated to a desired pressure for supplying the hydraulic pressure. When the duty ratio is 0%, the operation of the electromagnetic valves 52, 53, 54, 57, and 62 is topped, respectively, and the hydraulic pressure is supplied continuously under the demagnetizing condition of the valve. Further, when the duty ratio is 100%, the maximum hydraulic pressure is supplied continuously under the exciting condition of the electromagnetic valves 52, 53, 54, 57, and 62, respectively. Consequently, the hydraulic pressure supplied to each clutch and each brake can be regulated an appropriate pressure by controlling the duty ratio for each electromagnetic valve 52, 53, 54, 57, and 62 between 0% to 100% by using the controller.

The select pattern of the shift lever includes e.g. P (parking), R (reverse), N (neutral), D (automatic five forward speeds), 2 (automatic two forward speeds), and L (fixed to the 1st speed). The function of the each frictional engaging element when the shift lever is set to the respective positions are shown in FIG. 7. In the figure, symbol "○" indicates that an engagement condition is achieved by hydraulic operation, and symbol "—" indicates that a releasing condition is achieved.

For example, the fourth speed ratio is achieved when the first brake 11, the second brake 12, the third clutch 10, and the third brake 41 are released, and the first clutch 8, the second clutch 9, and the fourth clutch 38 are engaged. The sun gear 34 of the third planetary gear mechanism 31 is fixed to the carrier 35 by the engagement of the fourth clutch 38, therefore the output shaft 37 is driven under the condition of the gear ratio of 1.

A shift from the fourth speed ratio to the third speed ratio is achieved when the fourth clutch 38 is released, and the sun gear 34 in the third planetary gear mechanism 31 is fixed by locking of the one-way clutch 40. Namely, when the drum 39 becomes rotatable by releasing of the fourth clutch 38, the rotational speed of the sun gear 34 is decreased, and the sun gear 34 is fixed by the function of the one-way clutch 40 when the sun gear 34 is about to rotate in a reverse direction. The engagement of the third brake 41 can be carried out at an appropriate period after locking of the one-way clutch 40 takes place.

Further, when reducing speed to stop the vehicle, the automatic transmission, as described above, shifts, for example from the third speed ratio to the first speed ratio. The shifting from the third speed ratio to the first speed ratio is achieved by the release of the second clutch 9 and the engagement of the second brake 12, namely, by the switching operation from the second clutch 9 to the second brake 12. Among the first speed ratio and the third speed ratio, the switching operation of a clutch and a brake in the second transmission mechanism is not necessary as shown in FIG. 7. Thus, the shift among the first speed ratio and the third speed ratio can be carried out only by the first transmission mechanism. Furthermore, the shift is also operatively controlled by the second transmission mechanism.

Figure 8A:
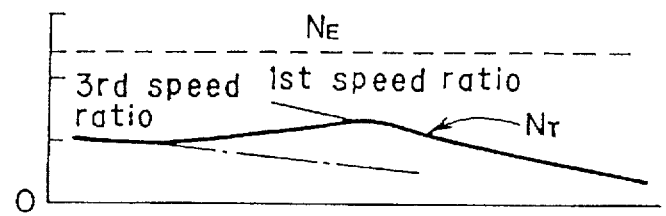
FIG. 8 is a timing chart showing the number of input rotations and an output shaft torque in speed-shift.
Figure 8B:
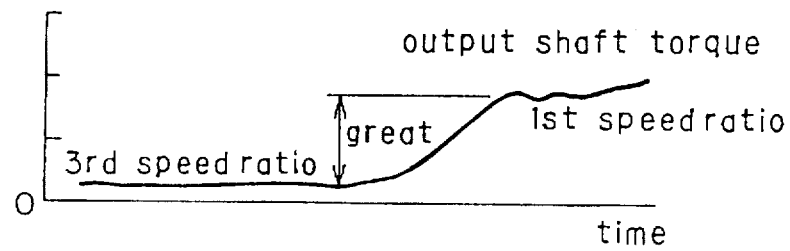

In the conventional automatic transmission, described above, when stopping the vehicle, the shifting from the third speed ratio to the first speed ratio is carried out in the area (power-ON area) where the rotating speed $N_T$ of the input shaft 7 becomes lower than the idle rotation speed $N_S$ of the engine as the vehicle speed is lowered, as shown in FIG. 8(a). Namely, the shift is carried out by the switching from the second clutch 9 to the second brake 12 at extremely low speed in the range of the rotating under the condition that the rotating speed $N_T$ of the input shaft 7 is lower than the idle rotation speed $N_E$ of the engine. Therefore, the difference between the rotation speed of the engine and the input shaft 7 is larger, and torque of the output shaft 37 is increased to torque of the first speed ratio in a short period of time (see FIG. 8(b)) during which the gear ratio of the first speed ratio is combined with a torque increase due to the torque converter 2.

Figure 1:
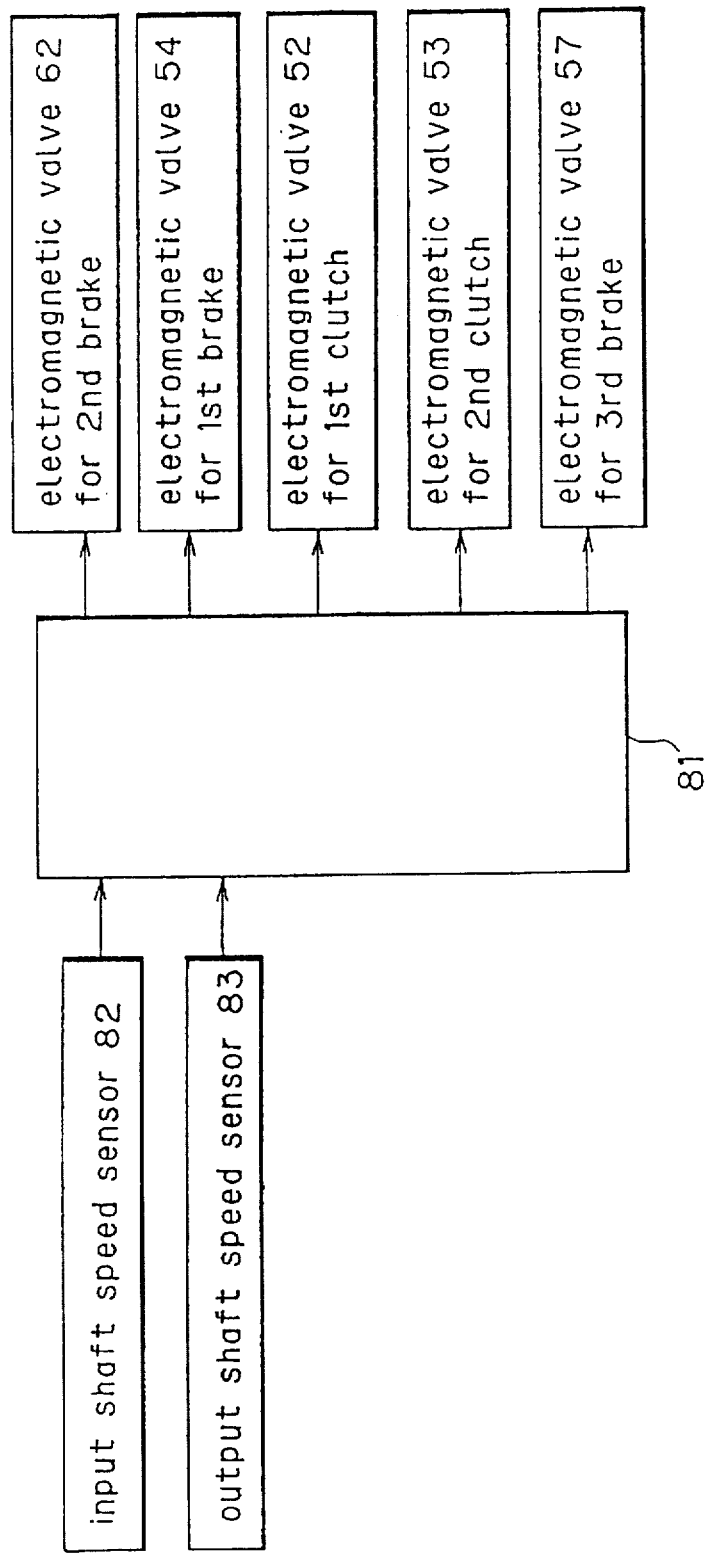
FIG. 1 is a control block diagram showing a shift control method according to an embodiment of the present invention.
Figure 2:
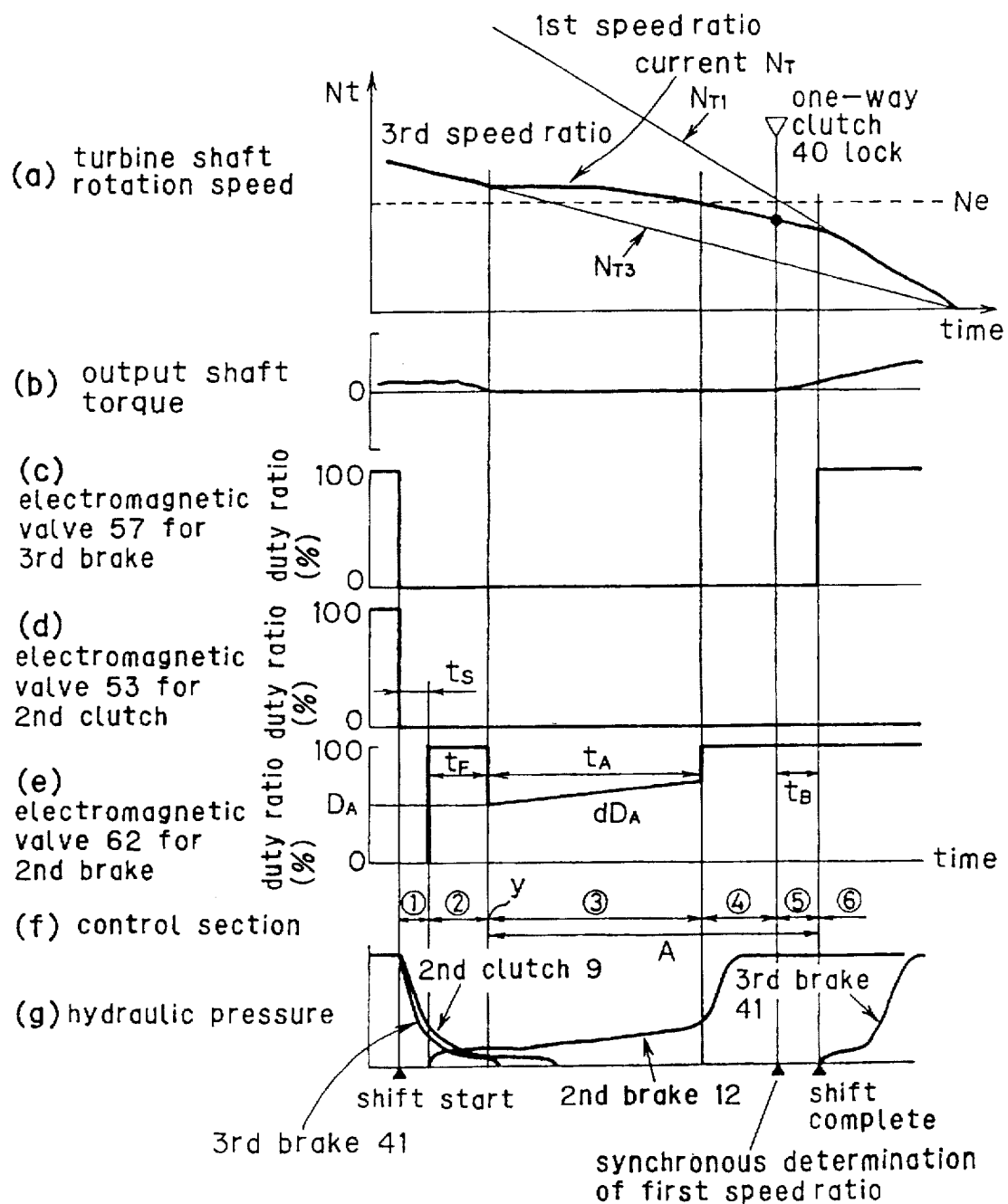
FIG. 2 is a timing chart in a speed-shift.
Figure 3:
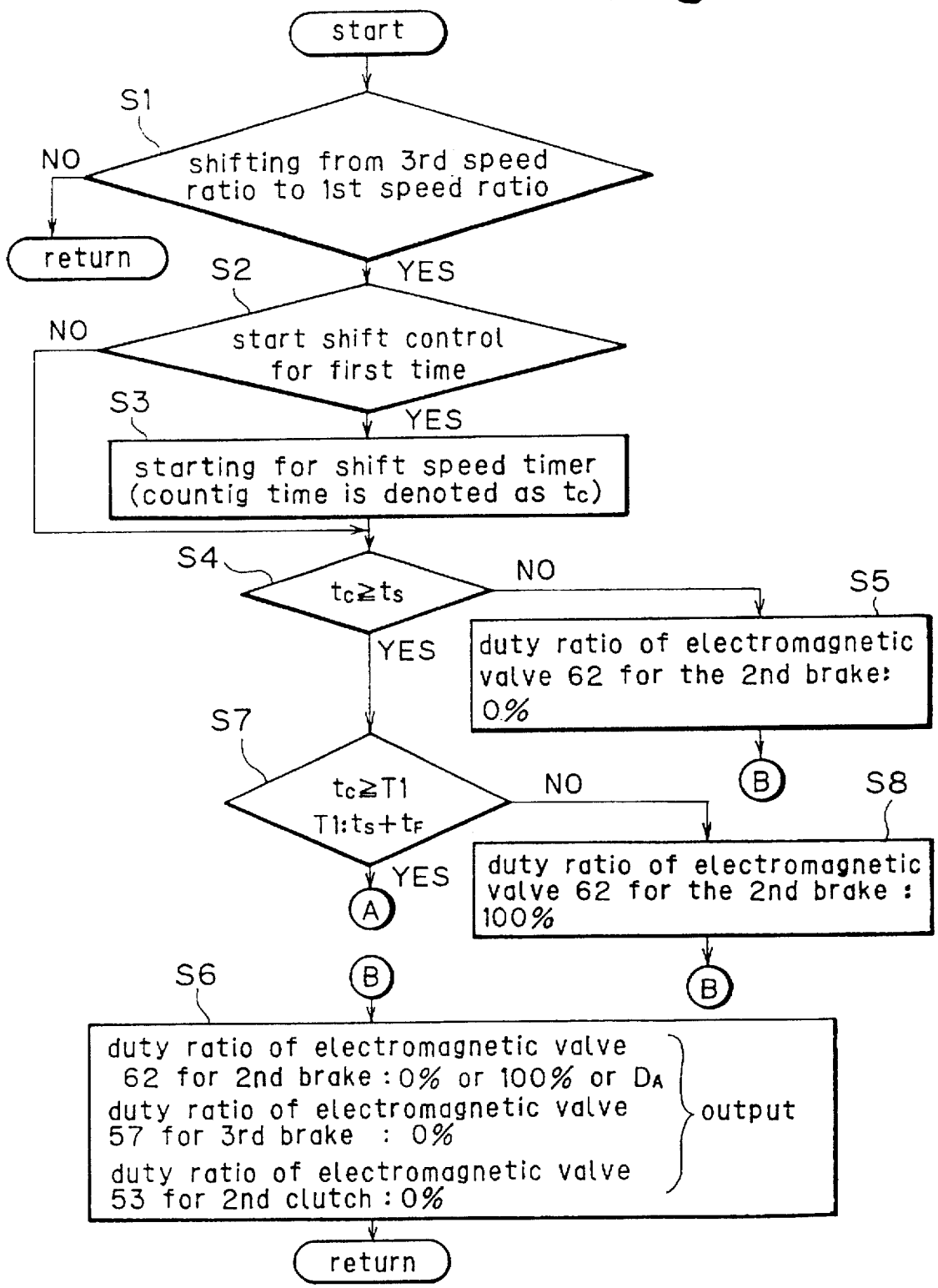
FIG. 3 is a flow chart showing a control flow of a shift control method.
Figure 4:
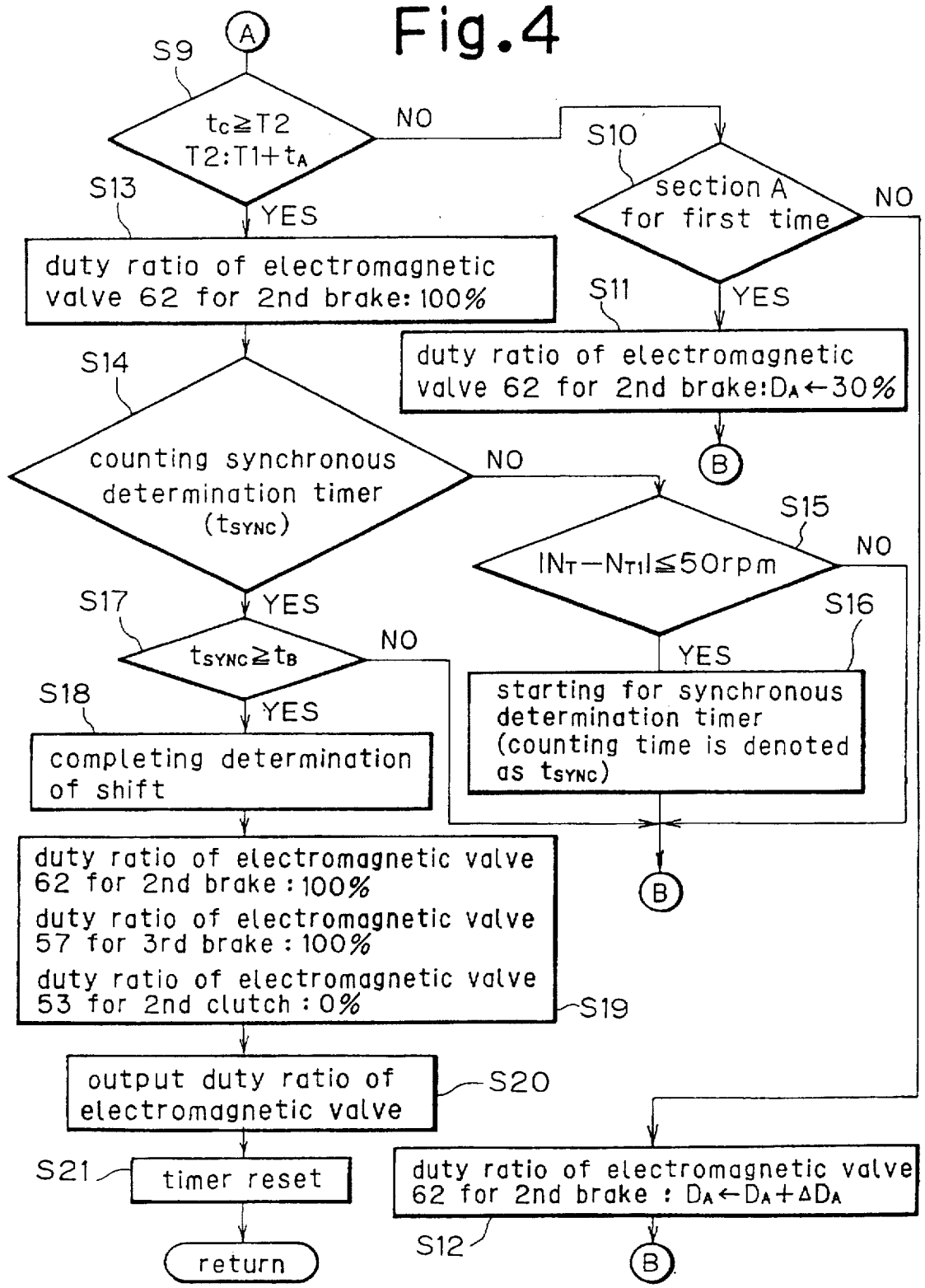
FIG. 4 is a flow chart showing a control flow of a shift control method.

The drawings show examples of shifting from the third speed ratio to the first speed ratio before stoppage of the vehicle. FIG. 1 shows a control block diagram of the shift control method according to the embodiment of this invention, FIG. 2 shows a timing chart in a speed-shifting, and FIGS. 3 and 4 show controlling flow charts of the shift control method. The shift control method according to this embodiment is carried out by the automatic transmission illustrated in FIGS. 5 to 7. Therefore, the same symbols and numerals are used in FIGS. 1 to 4, and the repetition of the descriptions of the apparatus, the hydraulic circuit and the like will be omitted.

As shown in FIG. 1, a controller 81 for carrying out the shift control method according to this embodiment stores therein a general shift pattern having up-shift lines and down-shift lines. Information of an input shaft speed sensor 82 for detecting a rotation speed of an input shaft 7 and information of an output shaft speed sensor 83 for detecting a rotation speed of an output shaft 37 are input to the controller 81. In addition, the rotating speed of the engine, the position of the shift lever, a degree of a throttle opening, the vehicle speed and the like are input to the controller 81. Further, the controller 81 outputs instruction signals for operating to electromagnetic valves 52 to 54, 57, and 62 of respective frictional engaging elements. Further, the controller 81 is provided with a shifting timer function for counting a shifting time and a synchronous determining timer function for determining a synchronization. In the shift control method according to this embodiment, the vehicle speed of the 3-1 down-shift line on a shift pattern is shifted to a higher-speed side to start the shift in a power-OFF condition when shifting from the third speed ratio to the second speed ratio prior to stopping of the vehicle. The third brake 41 is released so that the output shaft 37 of the second transmission mechanism is in the free condition (the neutral condition). In the meantime, the second clutch 9 of the first transmission mechanism is switched to the second brake 12 to shift the first transmission mechanism from the third speed ratio to a speed ratio condition corresponding to the first speed ratio. After this shift is completed and the one-way clutch 40 is mechanically locked, the third brake 41 is engaged again. By this operation, it is possible to prevent the vehicle from shocks caused by the shift.

Description will now proceed to the shift control method from the third speed ratio to the first speed ratio before stoppage of the vehicle based on FIGS. 2 to 4.

When the third speed ratio is shifted to the first speed ratio, the second clutch 9 as the frictional engaging element at the high-speed side is switched to the second brake 12 serving as the frictional engaging element at a low-speed so as to complete the switching to the second brake 12 in an area (the power-OFF condition) where a turbine shaft rotation speed $N_{T3}$ of the third speed ratio is higher than an idle rotation speed $N_E$ of the engine. Namely, as shown in FIG. 2(a), the duty ratio of the electromagnetic valve 57 for the third brake is set from 100% to 0% (shown in FIG. 2(c)) in the area where the turbine shaft rotation speed $N_{T3}$ of the third speed ratio is higher than the idle rotation speed $N_E$ of the engine. The third brake 41 is quickly and responsively released to free the output shaft 37. In this condition, the turbine shaft rotation speed $N_{T3}$ of the third speed ratio is in a higher area in comparison with the idle rotation speed $N_E$ of the engine, therefore, the sun gear 34 of the third planetary gear mechanism is not locked by the one-way clutch 40, thereby the vehicle is in the neutral condition.

At the same time, the duty ratio of the electromagnetic valve 53 for the second clutch is decreased from 100% to 0% (shown in FIG. 2(d)) in order to quickly and responsively release the second clutch 9 at the time of shifting from the third speed ratio to the first speed ratio. When the duty ratio of the electromagnetic valve 53 for the second clutch is decreased 0%, the hydraulic pressure for maintaining the switch valve 61 at a position where the hydraulic pressure from the pressure valve 60 can be supplied to the fourth clutch 38 no longer exits. Therefore the position of the switch valve 61 is switched to a position where the hydraulic pressure from the pressure valve 60 can be supplied to the second brake 12 (shown in FIG. 6) after the lapse of a predetermined time $t_s$ (e.g. 60 ms). Accordingly, the electromagnetic valve 62 for the second brake is changed over to be in a condition for controlling the second brake 12.

As shown in FIG. 2(e), after the lapse of the predetermined time $t_s$, the duty ratio of the electromagnetic valve 62 for the second brake is set to 100% for a predetermined time $t_F$ (e.g. 200 ms) to clear the play of the piston. Thereafter, the ratio of the electromagnetic valve 62 for the second brake is set to $D_A$ (e.g. 30%) to smoothly engage with the second brake 12, and the duty ratio is increased with a predetermined gradient $dD_A$ (%/S) for a predetermined time $t_A$ (e.g. 500 ms). Thereafter the duty ratio is set to 100% to engage the second brake 12 at the maximum hydraulic pressure. By this operation, the shift in the first transmission mechanism side is completed, and since the output shaft 37 is in the free condition, there is no shock caused by the shift. The duty ratio of the electromagnetic valve 62 for the second brake is slowly increased to prevent generating of a shock caused by inertial force due to a sudden change in the rotational speed of the first transmission mechanism. When the electromagnetic valve 62 for the second brake is shared by the second brake 12 and the fourth clutch 38 through the switch valve 61, as shown in FIG. 6 the predetermined time $t_s$ is required to release the hydraulic pressure (the hydraulic pressure to the second clutch 9) which changes over the switch valve 61. When the electromagnetic valves are individually provided, the predetermined time $t_s$ is not required, and the duty ratio of the electromagnetic valve 62 for the second brake can be instantaneously raised to 100%.

After the shift in the first transmission mechanism is completed, and when the vehicle speed is decreased by operations of the brake and the like, as shown in FIG. 2(a), the turbine shaft rotation speed $N_T$ becomes lower than the idle rotation speed $N_E$ of the engine to be in a power-ON condition. In this power-ON condition, the rotating speed of the sun gear 34 of the planetary gear mechanism 31 gradually decreases, and the sun gear 34 is locked by the one-way clutch 40 at the time when the rotation speed of the sun gear 34 become 0 rpm to complete the synchronziation of the first speed ratio. Thereafter, the synchronization of the first speed ratio is determined at the time when a difference between the synchronous rotation speed of the first speed ratio $N_T$ and the turbine shaft rotation speed of the first speed ratio $N_{T1}$ becomes less than a predetermined value (e.g. 50 rpm). The duty ratio of the electromagnetic valve 57 for the third brake is set to 100% once again after the lapse of a predetermined time $t_s$ (e.g. 200 ms), and the third brake 41 is engaged at the maximum hydraulic pressure to complete the 3-1 downshift.

As shown in FIG. 2(b), for a while after the third brake 41 is released to start shifting, the torque at the output shaft 37 is shifted at the positive side by a positive slip of the torque converter 2. Thereafter, since the vehicle is in the neutral condition, the torque of the output shaft 37 is shifted at 0. When the sun gear 3 is locked by the one-way clutch 40 to achieve the first speed ratio, the torque of the output shaft 37 is smoothly increased in accordance with the increase of slip of the torque converter 2. As a result, even when the third speed ratio is shifted to the first speed ratio before stoppage of the vehicle, there is no sudden change of torque in the output shaft 37 during the shift and the feeling of the vehicle being pushed forward is not caused. Supply and exhaust conditions to the hydraulic pressure of the second clutch 9, the second brake 12, and the third brake 41 at the time of speed-shift are changed as shown in FIG. 2(g). The description will now be made with regard to the flow of the shift from the third speed ratio to the first speed ratio based on the flow charts as shown in FIGS. 3 and 4.

As shown in FIG. 3, a determination is made in Step S1 as to whether or not the transmission is being shifted from the third speed ratio to the first speed ratio. When it is determined that the transmission is being shifted, then a determination is made in Step S2 as to whether or not a start of the shift control is for the first time. When it is determined that it is for the first time, the shifting timer is initiated (a counting time denoted as $t_c$) in the Step S3 to proceed to Step S4. When the start of the shift control is determined that it is not for the first time, the Step directly proceeds to Step S4. In Step S4, the predetermined time $t_s$ for changing over the switch valve 61 is compared with the counting time $t_c$. When it is determined that the counting time $t_c$ is less than the predetermined time $t_s$, the duty ratio of the electromagnetic valve 62 for the second brake is set to 0% in Step S5 and proceed to Step S6. The Step S6, the duty ratio of the electromagnetic valve 62 for the second brake is set to 0%, the duty ratio of the electromagnetic valve 57 for the third brake is set to 0%, and the duty ratio of the electromagnetic valve 53 for the second clutch is set to 0% (① section in FIG. 2(f)). In this condition, the third brake 41 is released to make the vehicle in the neutral condition, and the second clutch 9 for achieving the third speed ratio is released When it is determined in Step S4 that the counting time $t_c$ is equal to or greater than the predetermined time $t_s$, a time T1 which includes the predetermined time $t_s$ and the predetermined time $t_F$ for clearing the play in the piston is compared with the counting time $t_c$ in Step S7, and when it is determined that the counting time $t_c$ is less than the time T1, the duty ratio of the electromagnetic valve 62 for the second brake is set to 100% in Step S8 and proceed to Step S6. In Step S6, the duty ratio of the electromagnetic valve 62 for the second brake is set to 100%, the duty ratio of the electromagnetic valve 57 for the third brake is set to 0%, and the duty ratio of the electromagnetic valve 53 for the second clutch is set to 0% (② section in FIG. 2(f). When it is determined in Step S7 that the counting time $t_c$ is equal to or greater than the time T1, then the Step proceeds to Step S9 in FIG. 4.

As shown in FIG. 4, in Step S9, a time T2 which includes the predetermined time $t_A$ for the increasing the duty ratio at a gradient $dD_A$ (%/S) and the predetermined time T1 is compared with the counting time $t_c$. When the counting time $t_c$ is less than the time T2, a determination is made in Step S10 as to whether or not a control section A (shown in FIG. 2(f)) is for the first time. When it is determined in Step S10 that the control section A is the first time, the duty ratio of the electromagnetic valve 62 for the second brake is set to the initial value $D_A$ (e.g. 30%) in Step S11 and proceed to Step S6. In Step S6, the duty ratio of the electromagnetic valve 62 for the second brake is set to DA (30%), the duty ratio of the electromagnetic valve 57 for the third brake is set to 0%, and the duty ratio of the electromagnetic valve 53 for the second clutch is set to 0% (y point in FIG. 2(f)). When it is determined in Step S10 that a control section B is not for the first time, then in Step S12, a current duty ratio $D_A$ of the electromagnetic valve 62 for the second brake is added with an increased value $\Delta D_A$ of the duty ratio of one cycle to set a new duty ratio $D_A$, and proceed to Step S6 (FIG. 3). The increased value $\Delta D_A$ is added to increase the duty ratio with the predetermined gradient dD (%/S) for the predetermined time $t_A$. In Step 6, the duty ratio of the electromagnetic valve 62 for the second brake is set to $D_A$ (the value plus the increased value $\Delta D_A$), the duty ratio of the electromagnetic valve 57 for the third brake is set to 0%, and the duty ratio of the electromagnetic valve 53 for the second clutch is set to 0% (③ section in FIG. 2(f)). In this condition, the second brake 12 for achieving the first speed ratio is gradually engaged.

On the other hand, when it is determined in Step S9 that the counting time $t_c$ is equal to or greater than the time T2, the duty ratio of the electromagnetic valve 62 for the second brake is set to 100% in Step 13 and proceed to Step S14. In Step 14, a determination is made as to whether or not that synchronous determining timer is counting. When it is determined that the timer is not counting, a determination is made in Step S15 as to whether or not the absolute value of a speed difference between the synchronous rotating speed $N_{T1}$ of the first speed ratio and the turbine shaft rotation speed $N_T$ of the first speed ratio is less than 50 rpm. When it is determined in Step S15 that the absolute value of the speed difference between the $N_T$ and $N_{T1}$ is greater than 50 rpm, it is determined that the synchronization of the first speed ratio is not established, and proceed to Step S6. When it is determined in Step S15 that the absolute value of the speed difference between $N_T$ and $N_{T1}$ is equal or less than 50 rpm, it is determined that the synchronization of first speed ratio is established, and the synchronous determining timer is set to the count time $t_{sync}$ in Step S16 and proceed to Step S6 (FIG. 3). In Step S6, the duty ratio of the electronic valve 62 for the second brake is set to 100%, the duty ratio of the electromagnetic valve 57 for the third brake is set to 0%, and the duty ratio of the electromagnetic valve 53 for the second clutch is set to 0% (④ section in FIG. 2(f)). In this condition, the second brake 12 is for achieving the first speed ratio is engaged at the maximum hydraulic pressure.

When it is determined in Step S14 that the synchronous determining timer is still counting, namely, when the synchronziation of the first speed ratio is determined and the synchronous determining timer is set to start, a determination is made in Step S17 as to whether or not the counting time $t_{sync}$ is equal to or greater than the predetermined time $t_B$ after determination of the synchronization. When it is determined in Step S17 that the counting time $t_{sync}$ is less than the predetermined time $t_B$ Step S6 (FIG. 3) is executed. In Step S6, the duty ratio of the electronic valve 62 for the second brake is set to 100%, the duty ratio of the electromagnetic valve 57 for the third brake is set to 0%, and the duty ratio of the electromagnetic valve 53 for the second clutch is set to 0% (⑤ section in FIG. 2(f)).

In Step S17, when the counting time $t_{sync}$ is judged to be equal to or greater than the predetermined time $t_B$, it is determined that the shift to the first speed ratio is completed, and a shift-complete flag is set in the Step 18. Thereafter, in Step S19, the duty ratio of the electromagnetic valve 62 for the second brake is set to 100%, the duty ratio of the electromagnetic valve 57 for the third brake is set to 100%, and the duty ratio of the electromagnetic valve 53 for the second clutch is set to 0%. In Step S20, signals for instructing the electromagnetic valve 62, 57, and 53 to operate at this ratio's are output. In Step S21, the shifting timer and the synchronous timer are reset to complete the process (⑥ section in FIG. 2(f)). In this condition, the third brake 41 is engaged again at the maximum hydraulic pressure to transmit the driving power to the output shaft 37.

Accordingly, the shift control method according to this embodiment, when the third speed ratio is shifted to the first speed ratio before stoppage of the vehicle, the third brake 41 is released to make the output shaft 37 of the second transmission mechanism in the free condition under the Power-OFF condition. In the mean time, the first transmission mechanism is shifted from the third speed ratio to the speed ratio corresponding to the first speed ratio by switching the second clutch 9 of the first transmission mechanism to the second brake 12. After this shift is completed, the one-way clutch 40 is locked to transmit the driving power to the output shaft 37. The shift in the first transmission side is carried out when the output shaft 37 in the free condition in which the vehicle is in the neutral condition, and thereby the vehicle preventing shocks caused by the shift. In addition, the shift in the second transmission side is carried out by the one-way clutch 40, and the feeling that the vehicle is being pushed forward before the stoppage of the vehicle is prevented, thereby obtaining a smooth shift operation.

In the above described embodiment, the shift from the third speed ratio to the first speed ratio has been explained, and similarly, it is possible to carry out the shift from the second speed ratio to the first speed ratio or the third speed ratio to the second speed ratio.

What is claimed is:

1. A shift control method for an automatic transmission having a first transmission unit connected to an engine, said first transmission unit achieving a plurality of speed ratios, and a second transmission unit achieving a plurality of speed ratios, a power transmission path of said second transmission unit being connected in series with a power transmission path of said first transmission unit, the method comprising:

instructing said automatic transmission to downshift from a first speed ratio to a second speed ratio, said first speed ratio being higher than said second speed ratio, establishing a neutral condition in one of said first and second transmission units based on said instruction;

shifting a speed ratio of the other of said first and second transmission units from a first condition corresponding to said first speed ratio to a second condition corresponding to said second speed ratio; and shifting a speed ratio of said one of said first and second transmission units from said neutral condition to a third condition corresponding to said second speed ratio after the other of said first and second transmission units has completed shifting from said first condition to said second condition.

2. A method as claimed in claim 1, further comprising:

detecting an operating condition of said engine, and wherein said neutral condition is established when a power-off condition of said engine is detected.

3. A method as claimed in claim 2, wherein said neutral condition is established by disengaging a hydraulic frictional engaging element provided in said one of said first and second transmission units.

4. A method as claimed in claim 3, wherein said speed ratio of said one transmission mechanism is equal to said second speed ratio and said first speed ratio, and said hydraulic frictional engaging element being engaged again after an engagement of a one-way clutch provided in said one of said first and second transmission.

5. A method as claimed in claim 1, wherein said other of said first and second transmission units includes a first hydraulic frictional engaging element to be engaged upon achieving said first speed ratio, a second hydraulic engaging element to be engaged upon achieving said second speed ratio, he method further comprising:

releasing said first hydraulic frictional element based on said down shift instruction; and starting engagement of said second hydraulic engaging element after the lapse of a predetermined time from said down shift instruction.

6. A method as claim in claim 5, wherein said automatic transmission includes a hydraulic control unit for controlling a hydraulic pressure supplied to said each hydraulic frictional engaging element, and said hydraulic control unit comprising:

an electromagnetic valve for controlling the hydraulic pressure supplied to said second hydraulic frictional engaging element;

a third hydraulic frictional engaging element disposed in either one of said first transmission mechanism and said second transmission mechanism, said third hydraulic frictional engaging element being engaged upon achieving a predetermined speed ratio independently from said second hydraulic frictional engaging element;

a switch valve for switching over the hydraulic pressure, regulated by said electromagnetic valve, between a first position for supplying the regulated hydraulic pressure to said second hydraulic frictional engaging element and a second position for supplying the regulated hydraulic pressure to said third hydraulic frictional engaging element; and wherein said predetermined time being a time for switching said electromagnetic valve from said second position to said first position.

7. A method as claimed in claim 5, wherein said hydraulic pressure supplied to said second hydraulic frictional engaging element is increased by a predetermined ratio.

8. An automatic transmission system for downshifting from a first speed ratio to a second speed ratio, said first speed ratio being higher than said second speed ratio, comprising;

a first transmission unit connected to an engine, said first transmission unit achieving a plurality of speed ratios;

a second transmission unit achieving a plurality of speed ratios, a power transmission path of said second transmission unit being connected in series with a power transmission path of said first transmission unit; and a control unit for instructing said automatic transmission system to downshift from said first speed ratio to said second speed ratio, for causing one of said first and second transmission units to establish a neutral condition, for causing a shift in a speed ratio of the other of said first and second transmission units from a first condition corresponding to said first speed ratio to a second condition corresponding to said second speed ratio, and for shifting a speed ratio of said one of said first and second transmission units from said neutral condition to a third condition corresponding to said second speed ratio after the other of said first and second transmission units has completed said shift from said first condition to said second condition.

9. An automatic transmission system as claimed in claim 8, further comprising;

a detecting unit detecting an operating condition of said engine, and wherein said control unit controls said one of said first and second transmission units to establish said neutral condition when a power-OFF condition of said engine is detected.

10. An automatic transmission system as claimed in claim 9, wherein said one of said first and second transmission units includes, a hydraulic frictional engaging element being engaged when establishing said first speed ratio, and an one-way clutch provided in parallel to said hydraulic frictional engaging element, wherein said control unit disengages said hydraulic frictional engaging element to establish said neutral condition when said power-OFF condition of said engine is detected.

11. An automatic transmission system as claimed in claim 10, wherein said speed ratio of said one of said first and second transmission units are substantially the same as said second speed ratio and first speed ratio, and said hydraulic frictional engaging element being engaged again after an engagement of said one-way clutch has been established.

12. An automatic transmission system as claimed in claim 8, wherein said other of said first and second transmission units includes a first hydraulic frictional engaging element being engaged upon establishing said first speed ratio, and a second hydraulic frictional engaging element being engaged upon establishing said second speed ratio.

said controller releases said first hydraulic frictional engaging element upon instructing said downshift, and initiates engagement of said second hydraulic frictional engaging element after lapse of a predetermined time from said downshift instruction.

13. An automatic transmission system as claimed in claim 12, further comprising:

an electromagnetic valve controlling hydraulic pressure supplied to said second hydraulic frictional engaging element;

a third hydraulic frictional engaging element disposed in either one of said first and second transmission units, said third hydraulic frictional engaging element being engaged upon establishing a predetermined speed ration independently from said second hydraulic frictional engaging element;

a switch valve switching a position of said electromagnetic valve between a first position for supplying a hydraulic pressure regulated by said electromagnetic valve to said second hydraulic frictional engaging element, and a second position for supplying said regulated hydraulic pressure to said third hydraulic frictional engaging element, wherein said predetermined time being a time for switching said electromagnetic valve from said second position to said first position.

14. An automatic transmission system as claimed in claim 12, wherein said control unit increases said hydraulic pressure supplied to said second hydraulic frictional engaging element by a predetermined ratio.

* * * * *